Nov. 5, 1935.  W. H. BROOKLEY  2,019,652
SKY WRITING APPARATUS
Filed Oct. 13, 1933    5 Sheets-Sheet 1
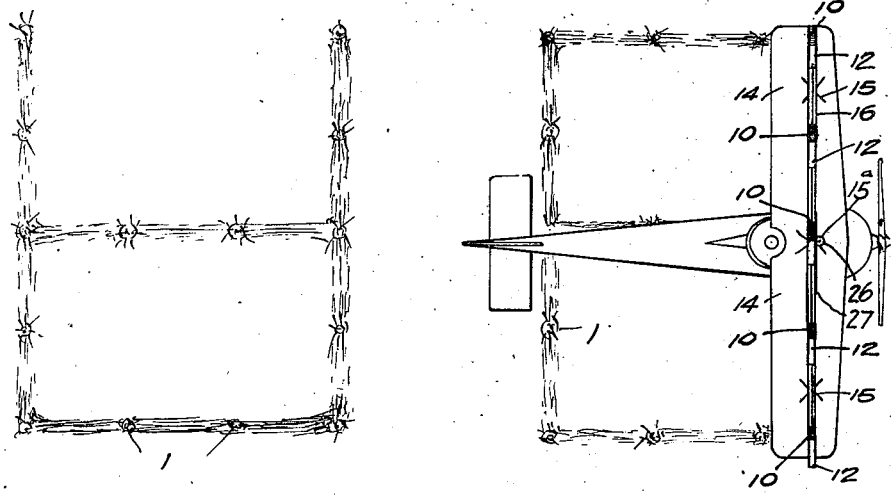
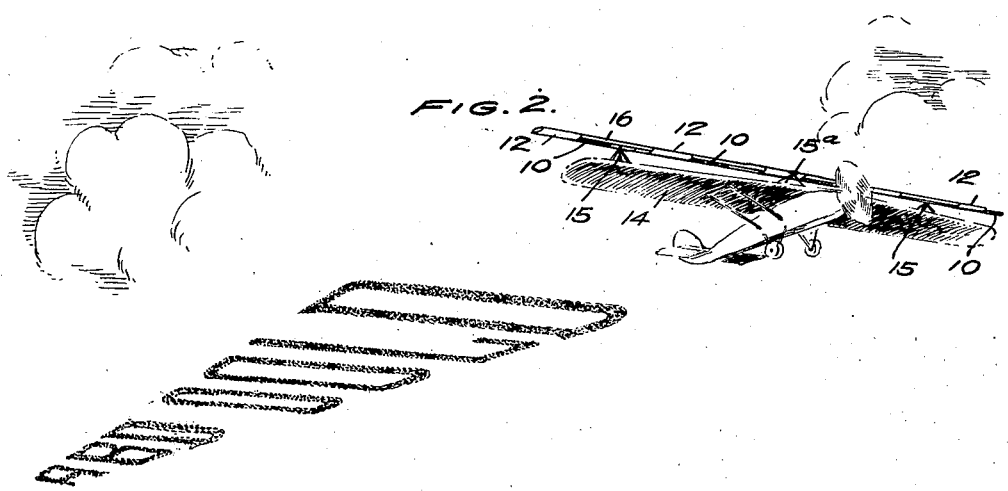
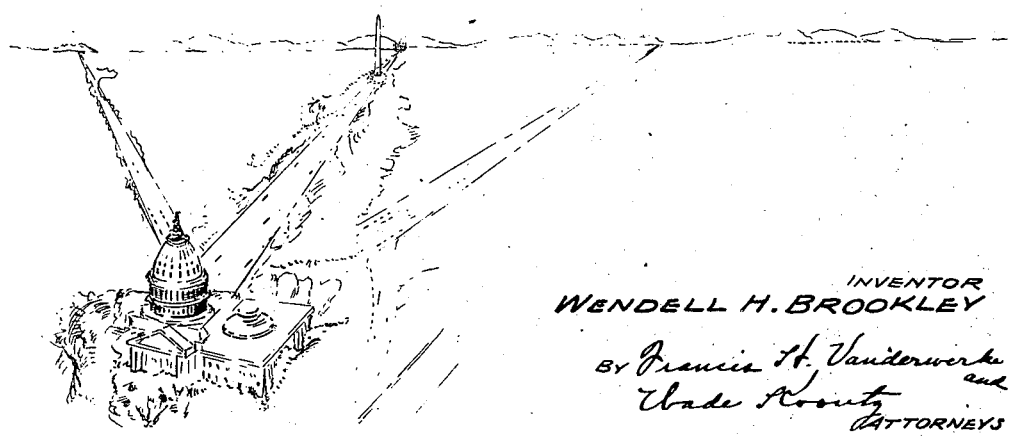
INVENTOR
WENDELL H. BROOKLEY
BY
ATTORNEYS Nov. 5, 1935.  W. H. BROOKLEY  2,019,652
SKY WRITING APPARATUS
Filed Oct. 13, 1933   5 Sheets-Sheet 2
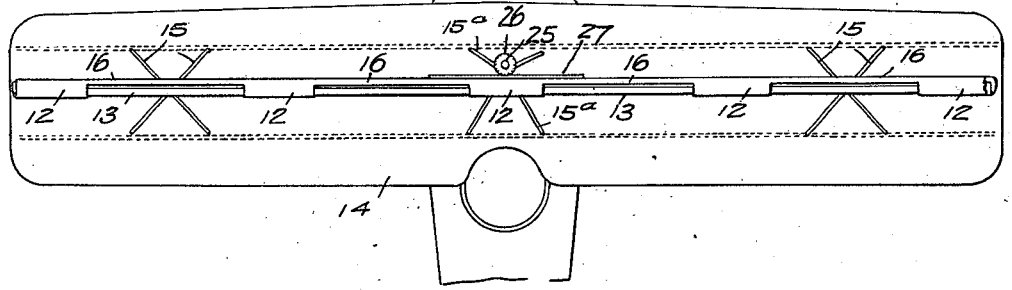
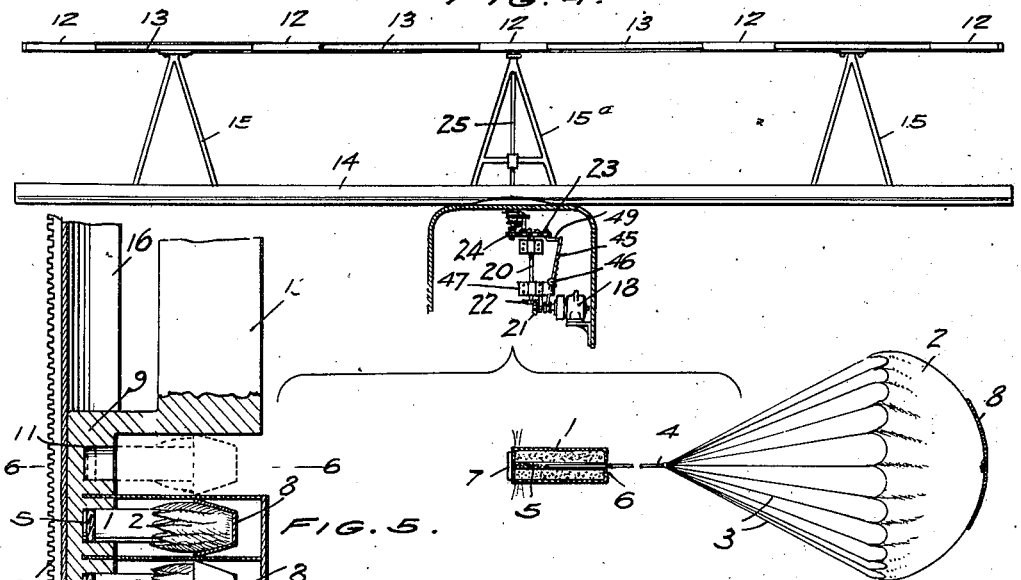
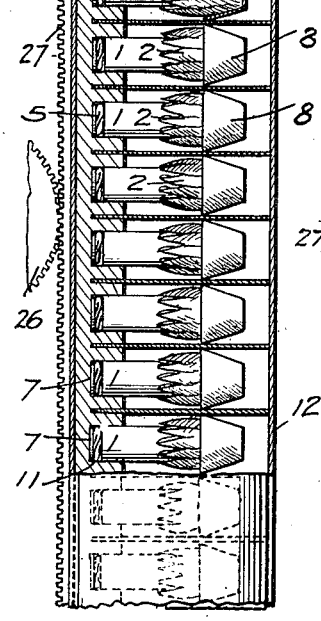
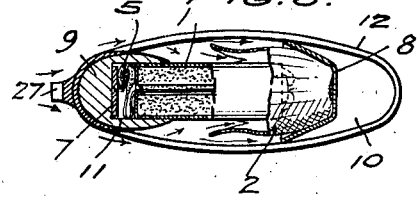
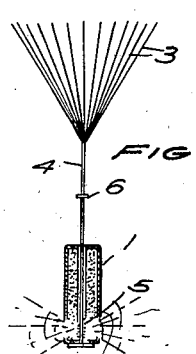
INVENTOR
WENDELL H. BROOKLEY
BY Francis H. Vanderwerken
and Wade Koontz
ATTORNEYS Nov. 5, 1935.  W. H. BROOKLEY  2,019,652
SKY WRITING APPARATUS
Filed Oct. 13, 1933  5 Sheets-Sheet 3
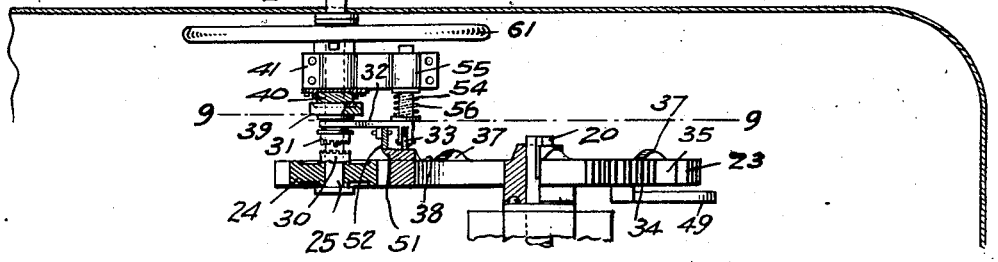
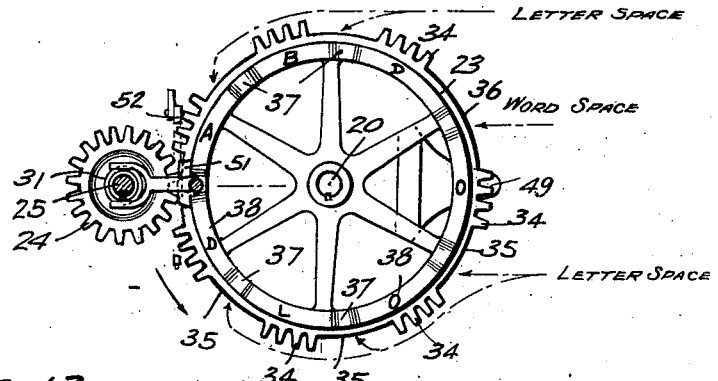
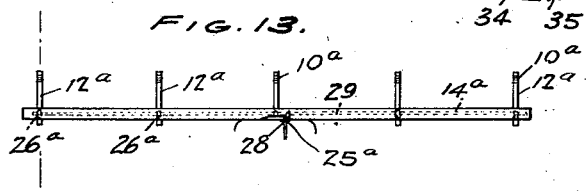
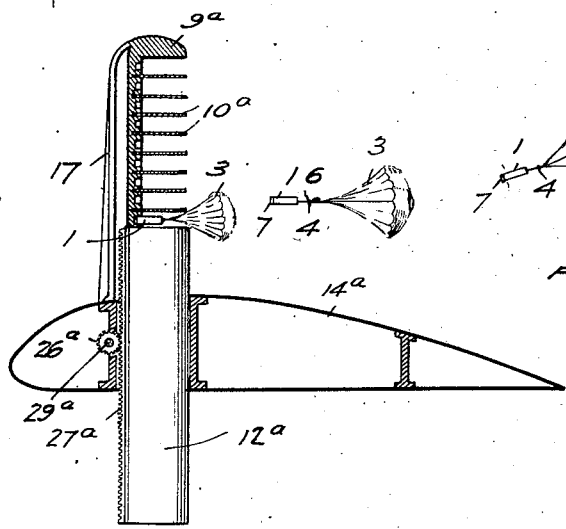
INVENTOR
WENDELL H. BROOKLEY
BY
ATTORNEYS Nov. 5, 1935.　　　W. H. BROOKLEY　　　2,019,652
SKY WRITING APPARATUS
Filed Oct. 13, 1933　　　5 Sheets-Sheet 4
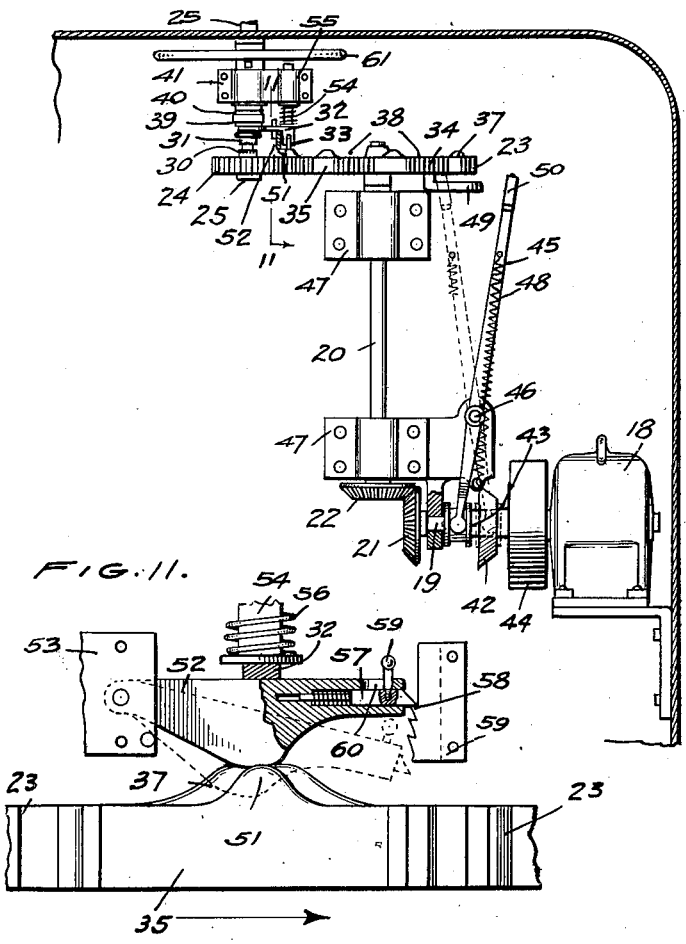
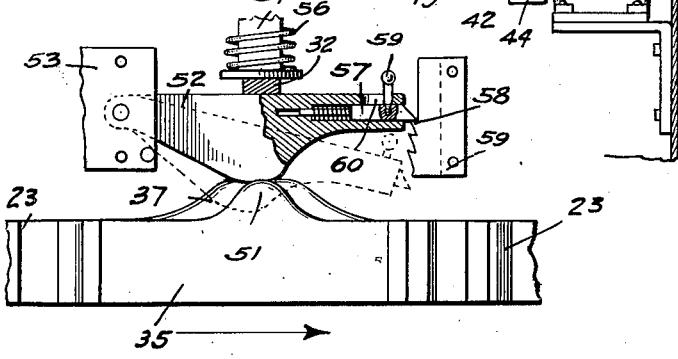
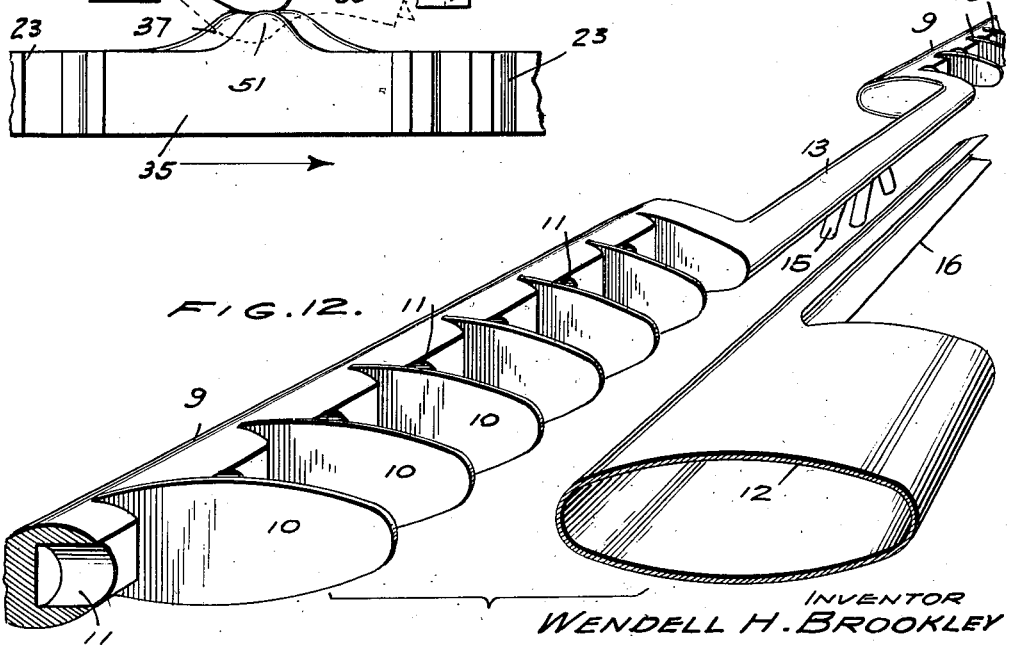
INVENTOR
WENDELL H. BROOKLEY
ATTORNEYS Nov. 5, 1935. W. H. BROOKLEY 2,019,652
SKY WRITING APPARATUS
Filed Oct. 13, 1933 5 Sheets—Sheet 5
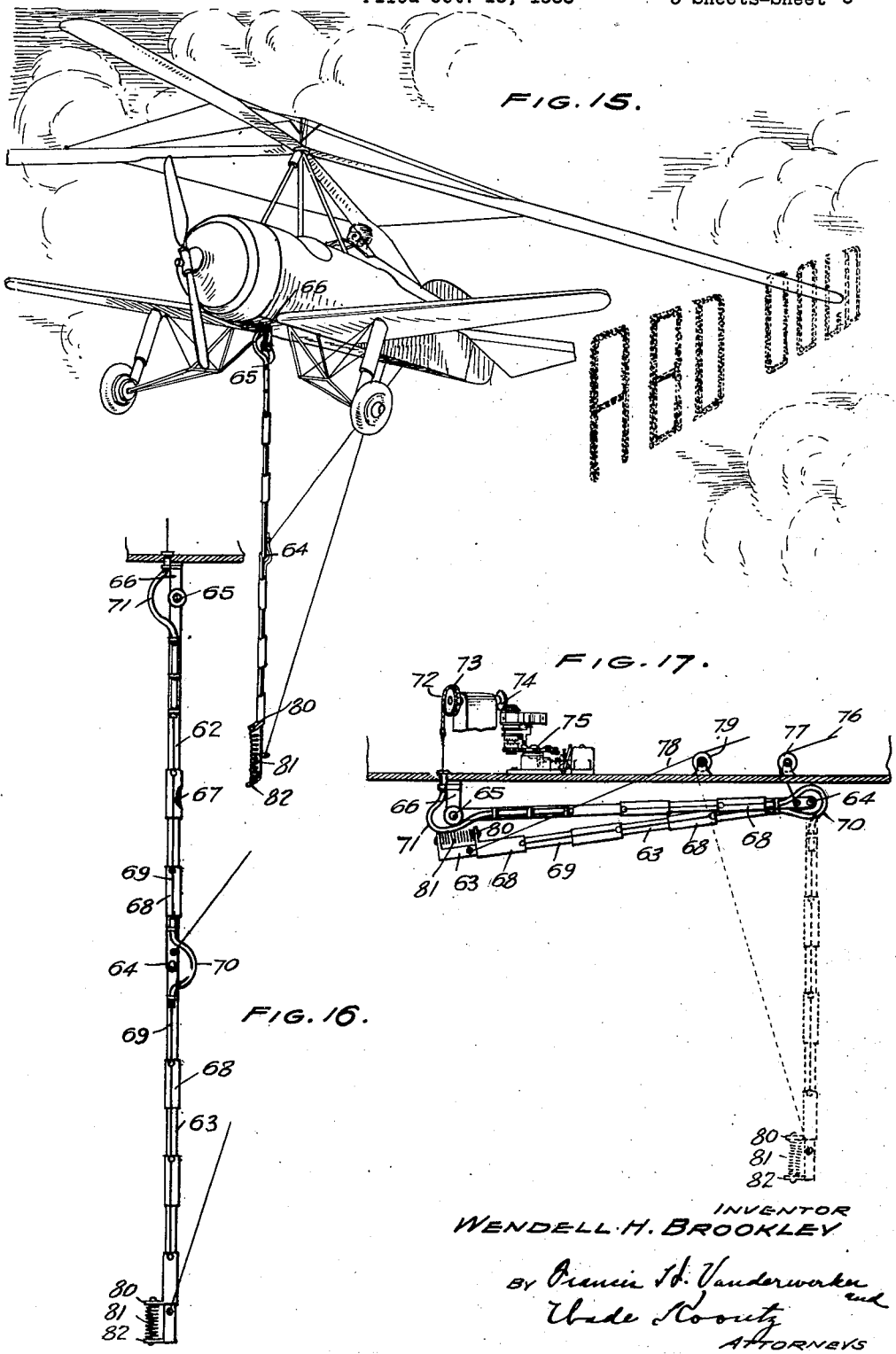
INVENTOR
WENDELL H. BROOKLEY
ATTORNEYS Patented Nov. 5, 1935

2,019,652

UNITED STATES PATENT OFFICE 2,019,652

SKY WRITING APPARATUS

Wendell H. Brookley, Washington, D. C.; Mary Joyce Fries Brookley executrix of said Wendell H. Brookley, deceased Application October 13, 1933, Serial No. 693,488

19 Claims. (Cl. 244—1)

(Filed but not issued under the act of March 3, 1883, as amended April 30, 1928; 370 O. G. 757)

The invention described herein may be manufactured and used by or for the Government for governmental purposes, without the payment to me of any royalty thereon.

This invention relates to improvements in aerial signalling devices in which illuminated signals in the form of signs, letters or words are displayed against the sky so as to be visible from the ground.

An important object of the invention is to provide a means of sky writing or printing to be used with aircraft in connection with the experiment, development and training of aircraft pilots for military purposes and which will prove valuable in time of war for both day and night signalling.

Other objects of the invention are: First to provide a more practical means of forming letters and words with parachute flare candles in a sky writing or sky printing operation, second, to reduce the time heretofore required in performing sky writing or sky printing operations by effecting a more positive and rapid launching of the flare candles, third, to provide a sky writing or printing device which can be used for printing a desired word, sign or signal in either a vertical or a horizontal plane, and fourth, to provide a sky writing device for airplanes by means of which the aerial signs, words or letters are formed in size approximately equal to or greater than the wing span of the airplane and, hence, have a greater range of visibility than is obtainable with current practice.

Other advantages and objects of the invention may be apparent from the following detailed description of the invention and from the accompanying drawings, in which:—

Figure 1 is a top plan view of an airplane in flight with the invention applied thereto and in the process of releasing the letter-forming flares.

Figure 2 is a pictorial view illustrating how the letters appear when viewed from below the airplane.

Figure 3 is a top plan view of the fore part of an airplane, illustrating one method of installing the invention on the wing of the craft for the forming of letters in a horizontal plane.

Figure 4 is a front view of the construction shown in Figure 3, with the fuselage in section to disclose the motor and related mechanism;

Figure 5 is an enlarged view of a portion of a magazine rack or container for the parachute flares, the rack being partly in section to disclose the flares positioned therein.

Figure 6 is a cross section through the rack taken on line 6—6 of Figure 5.

Figure 7 is detail view of one of the letter-forming parachute flare candles showing the same suspended in the air and burning in letter-forming position.

Figure 8 is an enlarged sectional view through the fuselage of an airplane showing the timing gear and associated parts of the flare-release timing mechanism.

Figure 9 is a sectional view on line 9—9 of Figure 8;

Figure 10 is an enlarged view of the assembled timing and motor drive mechanisms disclosing automatic clutch shifting and brake applying means.

Figure 11 is a detail view on an enlarged scale of a supplementary brake applying device;

Figure 12 is a detail view, in perspective, of a flare-holding rack and flare-releasing sleeve;

Figures 13 and 14 are views illustrating an alternative method of installing the flare-holding racks for forming the letters in a horizontal plane, and Figures 15 to 17, inclusive, illustrate a modified type of skywriting device suspended from an airplane for forming the words and letters in a vertical plane.

As indicated in the brief descriptions of the several views of the drawings, the invention herein described contemplates different designs of flare-holding racks and several methods of installation that will be satisfactory and proper for forming the letters in either a horizontal plane or a vertical plane, as desired.

In every case, the letters will be formed by small individual flare candles 1, each of which is suspended in the air by a small parachute 2 and ignited automatically when released from an airplane or other carrier. The flares can be manufactured to give practically any color, time of burning, degree of brilliancy, and rate of descent. The type of flare candle illustrated in the drawings is, in general, one that will be found satisfactory for use in connection with this invention. The parachute or canopy 2 is of paper, silk, or other light and sturdy material and has shroud lines 3 joined to an anchor wire 4 which passes centrally through the pyrotechnic material of the candle. The anchor wire and the candle are slidable relative to each other and the free end of the wire is provided with a match compound 5 to ignite the fuse end of the candle when drawn into the latter, the candle and wire being relatively slidable only within the limits defined by an abutment or stop 6 and a retainer disk 7, respectively carried by the wire 4; the disk 7 preventing the flare candle from sliding off the wire in the vertical position of the latter. The relatively spacing of the stops and the disk 7 is uniform on all flares and assures accurate and identical launching time for all flares.

In preparing each parachute flare candle for proper installation in the rack or holder, the parachute is "cupped" over the outer end of the flare to take the air as shown to advantage in Figure 6, so that air flowing in the direction indicated by the arrows will enter the parachute and thrust the same outwardly of the candle causing the slack part of the wire between the disk 7 and the bottom of the candle and carrying the match compound to be drawn into the candle for frictionally igniting the same. The impact of the disk 7 against the bottom of the flare candle combined with the air pressure acting against the unfolding parachute is sufficient to dislodge the candle from its socket in the holder so that it will be properly launched into the air for forming the desired letters or words as hereinafter more fully explained. The positive launching of the flare may be made more certain, if desired, by the addition to the parachute of a paper cap 8 glued, or otherwise secured, to the parachute and adapted in the folded or collapsed condition of the parachute to be cupped over the same to act as an "air catcher" or pilot chute, facilitating the opening of the parachute. The dimensions of the parachute flares are small and the entire charge is approximately two inches by four and one-half inches, with parachute folded and prepared for installation in the charge rack.

The magazine or charge rack for storing the parachute flares comprises a solid bar 9 having a series of shelf-like racks or partitions 10 projecting outwardly of one side of the bar and defining separate flare-compartments open on two sides and one end; a recess or socket 11 being formed in the bar 9 and at the base of each compartment to receive and support the inner or fuse end of the flare candle. The flare candle has a snug fit in the socket but is free to slip easily out of the same when pulled by the parachute. Normally, the parachute flares are covered and shielded from the air flow by means of sleeve 12 embracing the rack bar and slidable thereon to cover and uncover the flare compartments one after another. The bar 9, racks 10, and sleeves 12 are of streamline shape, as illustrated, and the racks 10 fit closely to the sleeve to prevent the passage of air into any uncovered compartment.

There are two methods of installing the charge racks upon an airplane to permit the forming of letters in a horizontal plane. In the construction shown in Figures 1 to 5 inclusive, and in Figure 12, five of the magazines are tied together by rigid links or tie rods 13 to form an elongated charge rack of a length approximately equal to the span of the wing 14 of the carrier plane. Any desired number of magazines may be so connected. The elongated charge rack is mounted by suitable means above the wing, preferably by frame-work supports 15, so as to be within the air-stream relative to the plane in flight but elevated beyond the propeller blast, the flare-compartments opening rearwardly of the plane. The slidable sleeves 12 of the respective magazines are also rigidly connected together by tie rods 16 so as to be moved in unison when shifted by the sleeve-actuating mechanism. In the modification represented in Figures 13 and 14, five unconnected magazines or charge racks are mounted vertically relative to the airplane wing and at uniformly spaced distances apart for substantially the full span of the wing; each magazine or charge rack being suitably braced, to the wing beam as shown at 17. The sleeves 11a slide up and down through the wing when shifted by the sleeve-actuating mechanism.

The sleeve-actuating mechanism includes a motor 18 driving a clutch shaft 19, which is geared to a timing gear shaft 20 through the medium of meshed pinions 21 and 22. Timing gear shaft 20 has fixedly mounted on its upper end a master timing gear 23 which drives a pinion 24 loosely mounted on a vertical shaft 25. In the method of installation shown in Figs. 1 to 4 inclusive, the timing gear pinion shaft 25 extends upwardly through the wing 14, being suitably journaled in a central framework 15a, and carries at its upper end a fixedly mounted rack pinion 26 meshing with a rack 27 on the central sleeve 12. In installing the device as shown in Figures 13 and 14, however, the timing gear pinion shaft 25a terminates adjacent the wing 14a and is geared, as shown at 28, to a rack pinion shaft 29 extending horizontally within the wing for substantially the entire span thereof. The shaft 29 carries a number of fixedly mounted rack pinions 26a, and each sleeve 12a is provided with a rack 27a in mesh with one of the rack pinions 26a.

The timing gear pinion 24 is placed into and out of driving relation with the timing gear pinion shaft 25 at predetermined times by a clutch mechanism operated automatically by the timing gear 23. This clutch mechanism comprises a clutch element 30 on the timing gear pinion 24 and a clutch sleeve 31 splined to the shaft 25 but slidable thereon to engage the clutch. For this purpose, the clutch collar is provided with a shifting lever 32 having at its free end a roller 33 resting upon a cam track on the timing gear 23.

The timing gear is designed to actuate the sleeves to uncover all the flare compartments of each magazine in one complete revolution of the gear, the design of the gear varying according to the particular words and letters to be printed. The timing gear is formed with relatively spaced groups of gear teeth 34, each group being representative of some particular letter, as indicated in Fig. 9. The ratio of the timing gear 23 and the timing gear pinion 24 is such that each sleeve is shifted to uncover a flare-compartment every time the pinion 24 is rotated a distance of one tooth. Thus, each group of timing gear teeth will rotate the timing gear pinion 24 and the timing gear pinion shaft 25 through a distance sufficient to release all the flares required for the formation of the desired letter. In forming the letter "A" for instance, the first tooth of the "A" group will rotate the pinion 24 to move the sleeves of the five magazines along their respective magazines until the first compartment of each magazine is uncovered, thereby releasing five flares in unison to form one leg of the letter "A". The next tooth in the "A" group meshing with pinion 24 causes the sleeves to be shifted further to uncover the second compartment of each magazine. Only two of the magazines have their second compartments loaded with flares, the remaining three being left blank, since only two flares are required at this stage of forming the letter, as will be readily understood from Figure 1. The shifting of the sleeves 12 continues as each successive tooth of the "A" group meshes with pinion 24 in the completion of the letter "A". In the same manner the letter "B" and the other letters in the series, are formed by the gear teeth 34, of the successive letter groups. Uniform spacing between the letters is assured by reason of the cut-outs 35 between the various groups of teeth 34, the pinion 24 being rotated at intervals, or only when in mesh with the teeth 34, and being idle during the passage of the cut-outs 35. A larger cut-out 36 is provided for spacing words.

The cam track on the timing gear is designed to cooperate with the roller 33 of the timing gear pinion clutch for releasing the clutch and applying a braking pressure on the timing gear pinion shaft 25 for the duration of each spacing interval. To this end, the cam track presents a series of hills and valleys, the hills or raised portions 37 being opposite to and coextensive with the letter-and-word spaces of the timing gear and the valleys 38 being opposite to and coextensive with the groups of timing gear teeth 34. When the roller 33 is atop one of the hills 37, the clutch is disengaged and the timing gear pinion 24 rotates without turning the timing gear pinion shaft 25. Positive stoppage of the shaft 25 is obtained by means of a friction brake including a brake shoe 39 carried by the clutch collar 31 and contacting with a wear plate 40 fixed on the underside of the timing gear pinion shaft bearing bracket 41, as shown in Fig. 8. When the roller 33 drops down into a valley 38, the clutch is engaged and the brake is released to permit shaft 25 to be rotated by the pinion 24. The brake and timing gear pinion shaft clutch mechanism thus operates automatically and alternately, the brake being applied when the clutch is disengaged and released when the clutch is engaged.

The motor clutch mechanism for connecting the motor 18 to the shaft 19 is shown to advantage in Figure 10, and comprises a clutch disk 42, carried by a clutch sleeve 43 splined to the shaft 19 but slidable thereon to shift the clutch disk 42 into and out of contact with the clutch side of the motor fly wheel 44 when moved by the hand shift lever 45. The shift lever is fulcrumed at 46 on the lower of the two timing gear shaft bearing brackets 47 and is moved past dead center automatically by a tensioned snap spring 48. When the motor clutch is disengaged, the shaft lever is positioned as indicated in the full lines of Fig. 10, and when the clutch is engaged the lever will be positioned as indicated in dotted lines, in which instance, the upper or handle-end of the lever is disposed beneath the timing gear 23. The shift lever remains in this position until the timing gear has completed one revolution, at which time the lever is quickly shifted, to disengage the motor clutch, by the cooperative action of the clutch lever snap spring 48 and a cam-dog 49 on the timing gear. The dog 49 is fixed to and depends from the underside of the timing gear so as to contact with a cam-dog roller 50 on the handle-end of clutch lever 45; the cam profile of the dog being such as to thrust the lever outwardly past dead center at which time the snap spring 48 acts to complete the shifting of the lever to the limit of its travel.

Supplementary braking mechanism, such as illustrated in Figs. 10 and 11, are provided to prevent vibration of the sleeves 11 and to hold the same against any shifting movement subsequent to the conclusion of a printing or writing operation. This mechanism includes a teat-like projection or cam 51 integral with the timing gear 23 and extending upwardly from the top face of the gear and on the outside of the cam track so as to strike against a pivotally mounted brake-latch lever 52. The brake-latch lever is disposed crosswise of the underside of the timing gear pinion clutch shift lever 32, being pivotally supported at one end to a conveniently placed supporting bracket 53 and normally hanging down into the path traveled by the cam 51, as indicated in dotted lines. The abutment of the cam 51 with the brake-latch lever 52 results in the latter being swung upwardly, carrying with it the clutch-and-brake lever 32 so that the brake is applied and the clutch mechanism is disengaged in the manner hereinbefore explained. The lever 32 is guided in its up and down movement by a guide plunger 54, at the roller-end, operating in a guide bearing 55 and aided by the clutch sleeve 31 sliding on the shaft 25. A spring 56 encircles the plunger 54 and is tensioned to exert a thrust on the lever 32 for moving and holding the same in lowered position in the absence of any counter-thrust. The brake-latch lever is automatically held in its raised, or brake-applying position, by a spring-actuated latch pin 57 housed within a recess in the free end of the lever and normally projecting outwardly thereof for engaging over a latch step 58 of the latch plate 59. The latch pin may be withdrawn from the latch step manually and held out of engagement therewith by any suitable means, such as by a finger-grip 59 operating in a bayonet slot 60. A hand wheel 61 is fixed on the timing gear pinion shaft 25 for turning same manually to reset the sleeves after each printing operation.

Inasmuch as the discharge of pyrotechnics within the corporate limits of certain cities is prohibited, the forming of letters and words in the vertical plane is a desirable feature of sky writing or printing since it could be performed without the city limits and yet be clearly visible to observers within the corporate limits. Figures 15 to 17 inclusive disclose a modification of the invention in which the charge rack is suspended vertically below the fuselage of the aircraft to permit the forming of letters in the vertical plane. It is desirable that the charge rack be foldable up against the fuselage when not in use and when taking off and landing. For this purpose it is preferably composed of sections hingedly connected together to permit of the folding or collapsing of the rack when desired. The rack may have any desired number of sections and each section may have as many magazines as desired but in the present case, the rack is shown and described as being constructed of an upper section 62 and a lower section 63, both sections being hingedly connected together at their adjacent ends as indicated at 64. The top end of section 62 is connected by a hinge 65 to a hanger bracket 66 secured to the fuselage. Each section has a number of magazines 67 for respectively accommodating a number of parachute flares and a slidable sleeve 68 for covering and uncovering the flare-compartments; the construction of the magazines and sleeves being substantially as shown in Fig. 12. The sleeves 68 are connected to one another for movement simultaneously by an operating wire or cable 69 which is conducted around the hinges 64 and 65 through arcuately curved flexible conduits 70 and 71 respectively. The operating wire or cable 69 extends inwardly of the fuselage and connects with a short length of chain 72 which winds and unwinds on a sprocket 73, the latter being fixed on one end of a sprocket shaft which has its opposite end geared, as shown at 74, to the master timing gear pinion shaft of the operating mechanism, the latter being on the floor of the fuselage as indicated generally at 75 and in all other respects being of the same construction and operation as the mechanism shown in Fig. 10.

When the device is in operation, the winding of chain 72 on the sprocket 73 will pull the cable 69 and the sleeves 68 upwardly to expose the flares in the magazines to the releasing action of the air flowing through the exposed compartments. In folding up the rack against the fuselage, the upper section 62 is first drawn up into position by a lifting cable 76 connected to the lower end of the section and passing over a pulley 77 to within convenient reach of the pilot. In like manner, the lower section 63 is subsequently drawn up by a cable 78 passing over a pulley 79, as illustrated in Figure 17. The lowermost sleeve of the charge rack has an extension 80 to which is connected one end of a spring 81, the other end of the spring being anchored to a foot 82 on the extreme end of the lower rack section. The raising of the sleeves results in the expansion or extension of the spring which reacts, upon the unwinding of the chain 72, to pull the sleeves down to their initial positions.

In view of the time required in forming letters it is necessary to operate at low speeds and to have an aircraft with low wing loading and with a possible addition of slots and flaps which will be necessary as a speed of approximately thirty to forty miles an hour will be most suitable for the skywriting or printing operation. This will permit a letter being formed in approximately one second and will allow time for the proper functioning of the individual charges. In order to obtain the low speeds in conventional type of airplanes even with low wing loading and the use of slots and flaps, it may be necessary to perform a power stall or lose a slight amount of altitude in a very flat glide. This can be accomplished, however, without difficulty. In the case of vertical writing or printing where the charge rack is suspended below the craft, an autogyro can be used to good effect due to its low speed. In the operation of the device, all sleeves move in unison with exactly the same travel and will uncover the same number of flare-compartments. The master timing gear within the fuselage, operated by a constant speed motor, is positive and will insure identical writing on each demonstration. The size of the letters is controlled entirely by the span of the airplane or by the length of the stream-lined rack holding the pyrotechnic charges. In the case of the horizontal rack installed above the wing, the length of the rack can be increased to overhang the ends of the wing, thereby allowing larger letters to be formed.

Having thus described the invention, what is claimed as new is:

1. An aerial signal device comprising a signalling member having means attached thereto for supporting it in the air, means supporting and inclosing the signal member and being operable to expose the same for release therefrom, means for producing air flow relative to the signal member supporting-and-inclosing means, and means for operating the signal supporting-and-enclosing means to expose the signal member to the force of the said air flow.

2. An aerial signal device comprising a plurality of signal members each of which has a parachute attached thereto, means supporting and enclosing the signal members and being operable to expose the same for release therefrom, means for producing air flow relative to the signal supporting-and-enclosing means, and means for operating the signal supporting-and-enclosing means to expose the signal members to the force of the said air flow in a predetermined order to effect the release thereof in letter-forming sequence.

3. An aerial signal device comprising means for supporting a parachute flare, means for producing an air flow relative to the flare-supporting means, means for shielding the parachute flare from the said air flow, and means for displacing the shielding means to expose the parachute flare to the pressure of the air flow to effect the launching of the said flares.

4. An aerial signal device comprising means for supporting a plurality of parachute flares, means for producing an air flow relative to the flare supporting means, means normally shielding the parachute flares from the said airflow, means for displacing the shielding means to expose the parachute flares selectively to the pressure of the air flow to effect the launching of the said flares in a predetermined order to outline a signal of given design.

5. An aerial signal device comprising aircraft-carried means for supporting a plurality of parachute flares within and shielded from the air stream relative to the aircraft, and means for exposing the said parachute flares in a predetermined order to the said air stream to effect the launching of the flares by the force of the air stream acting on the parachutes of the flares.

6. An aerial signal device comprising an ignitable signal member including means of supporting same in the air, means for producing air-flow relative to said signal member, means supporting and normally enclosing the signal member within the airflow, said means being operable to expose the signal member to the air flow to effect the launching of the same by the force of air impinging the signal member, means for operating the signal member supporting-and-inclosing means to cause exposure of the signal member, and means operating to ignite the signal member subsequent to the launching of the latter.

7. A night sky writing device, in which letters are formed with pyrotechnic charges composed of small individual flares suspended by parachutes, comprising the combination with aircraft of a streamlined rack releasably holding the pyrotechnic charges and mounted on the craft so to be within the airflow relative to the craft in flight, displaceable, shielding means carried by the rack and shielding the said charges of the rack normally from the force of the airflow, and means for displacing the shielding means and thus exposing the said charges to the said airflow.

8. A sky writing apparatus comprising, in combination, an airfoil, means of propelling the airfoil through the air, a series of flare-holding magazines supported on the airfoil and elevated in respect to the top surface of the foil, said magazines being relatively distributed at uniformly spaced distances apart horizontally of the airfoil for substantially the full span thereof, each magazine having accommodation for a group of parachute-flares, and means for releasing the parachute-flares from the said containers in letter-forming sequence to form letters of a size substantially equal to the span of the airfoil.

9. A sky writing apparatus comprising, in combination, an airfoil, means of propelling the airfoil through the air, a magazine for parachute-flares disposed horizontally above the airfoil and being of a length approximately equal to and coextensive with the span of the airfoil, spacing supports between the said airfoil and the said magazine, and means for releasing the parachute flares from the magazine in letter-forming sequence to form letters of a size substantially equal to the span of the airfoil.

10. A sky writing apparatus comprising, in combination, an airfoil, means of propelling the airfoil through the air, a magazine for parachute-flares disposed horizontally above the airfoil and being of a length approximately equal to and coextensive with the span of the airfoil, said magazine being provided along its trailing edge with longitudinally spaced groups of open flare-holding compartments, spacing supports between the said airfoil and the said magazine, a compartment-covering member for each group of flare-holding compartments, and being of a size to cover all compartments of a group to shield the parachute flares thereof from the air flow relative to the airfoil, each covering member being slidable on the magazine to successively uncover the flare compartments of its particular group, and an actuating mechanism connected with all the sleeves for moving the latter in unison.

11. In a sky writing apparatus employing pyrotechnic parachute flare candles, a flare holding and releasing mechanism comprising a streamlined bar adapted to be exposed to a flow of air and having a series of partitions projecting outwardly of the trailing edge of the bar and relatively spaced to define separate flare-compartments open on two sides and one end, each compartment having a socket in its base to seat the bottom end of the flare, a tubular member embracing the said bar and the said partitions and normally covering the said compartments to enclose and shield the flares from the action of the air flow, said tubular member being slidable on the bar to uncover the said compartments, and means for sliding said member.

12. In a sky writing apparatus, in combination, an airfoil, means of propelling the airfoil through the air, a plurality of magazines mounted on the said airfoil and extending vertically above the top surface thereof at uniformly spaced distances apart for substantially the full span of the airfoil, each magazine having a vertical row of open flare-compartments for accommodating a parachute-flare, means normally covering the compartments and shielding the flares from the air flow, and an actuating mechanism connected with all the compartment-covering means and operable to actuate the same for uncovering the said flare-compartments.

13. In a sky writing device, an airfoil having an opening vertically therethrough, means of propelling the airfoil through the air, a vertically disposed streamlined bar depending into said opening from a point spaced above the upper surface of the air foil, means on the airfoil and connected with the said bar for suitably bracing and supporting same, means integral with the said bar for receiving and supporting a plurality of parachute flares in vertically spaced relation on the trailing side of the bar and, lineal to the airflow with the parachute-end of the flares outermost, a sleeve operating in the said opening of the air foil and encircling the said bar and parachute flares, said sleeve being slidable relatively to the bar for uncovering the said flares, and means for sliding the said sleeve.

14. A sky writing apparatus comprising a magazine having a plurality of compartments for storing writing elements, a compartment covering member carried by said magazine and normally confining the writing elements within the compartments, said covering member being slidable on said magazine to uncover the compartments and release the writing elements, and means for actuating said member including a shaft, an actuating connection between the shaft and the said member, a pinion loose on said shaft, a motor-driven timing gear driving said pinion, and a clutch mechanism for coupling the said shaft and pinion including clutch-operating elements carried by the timing gear and operating the clutch mechanism to hold the pinion clutched to the shaft at predetermined times during rotation of the timing gear.

15. A sky writing apparatus comprising the combination with an airplane of means on the airplane for receiving and releasably supporting a plurality of parachute flare candles within the air stream relative to the craft with the candles disposed horizontally in the air stream and the parachutes cupped over the trailing ends of the candles to take the air, means enclosing and shielding the parachute flare candles from the said air stream and being operable to expose the same to the launching force of the air stream acting upon the parachutes, and means for operating the said parachute flare candle enclosing and shielding means to effect exposure of the flare candles.

16. A sky writing apparatus including means for storing a plurality of writing elements, and means for releasing the writing elements from the storing means in letter-forming sequence including a timing gear, a timing gear shaft, a motor, a motor clutch mechanism for connecting the motor with the said shaft and including a clutch shift lever, and means on said timing gear having abutment at the end of a complete revolution of the timing gear with the said lever to shift the same automatically out of clutch-engaging position.

17. A sky writing apparatus including a container having a plurality of compartments for storing writing elements, and a mechanism for releasing the writing elements from the container including a closure member normally covering the said compartments and slidable on the container for uncovering the compartments at timed intervals; a rotatable shaft operatively connected with said closure for imparting a sliding impulse thereto; means for impelling said shaft at predetermined intervals and for timed periods; said means including a time gear; and means operated by the timing gear for applying a braking force on the said shaft between the periods of impulsion.

18. In a sky writing apparatus, a container having a series of compartments for holding pyrotechnic flares, a sleeve covering said compartments and slidable relative to the container for uncovering the compartments, a rack on said sleeve, a shaft geared to said rack and rotatable to slide the said sleeve, a pinion loose on said shaft, a timing gear in mesh with said pinion, means for rotating said timing gear, a combined clutch and brake connection between the said shaft and the said pinion including separate brake and clutch elements alternately operable so that the brake is applied when the clutch is disengaged and released when the clutch is engaged, timing-gear actuated means for automatically effecting the alternate operation of the brake and clutch elements at predetermined times during the rotation of the gear, latch means for retaining the said combined clutch-and-brake connection in braking position unit manually released, and means on the said timing gear for operating the said latch means, said latch operating means being arranged on the gear to engage and operate the latch means at the completion of a revolution of the said gear.

19. A sky writing apparatus, substantially as described in claim 7, with the charge rack beneath and hingedly attached to the aircraft for suspension vertically below the fuselage of the aircraft to permit the forming of letters in a vertical plane, said rack being composed of sections hingedly connected together to permit of the folding or collapsing of the rack up against the underside of the aircraft.

WENDELL H. BROOKLEY.